Nov. 10, 1931.  J. R. SCHONBERG  1,831,265
PROCESS FOR THE TREATMENT OF HYDROCARBON OILS
Filed July 18, 1929
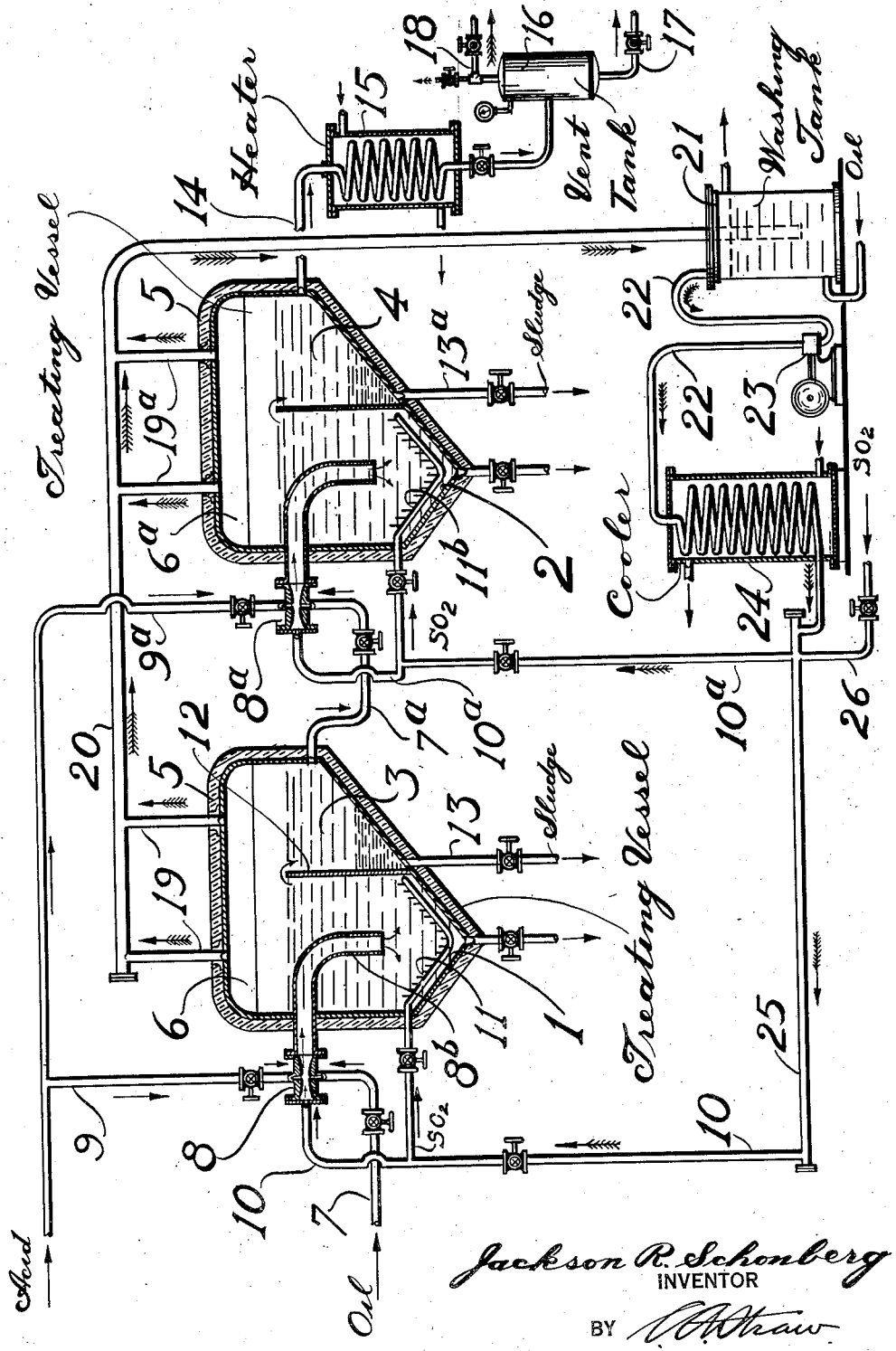
Jackson R. Schonberg
INVENTOR
BY
ATTORNEY Patented Nov. 10, 1931

1,831,265

UNITED STATES PATENT OFFICE

JACKSON R. SCHONBERG, OF WESTFIELD, NEW JERSEY, ASSIGNOR TO STANDARD OIL DEVELOPMENT COMPANY, A CORPORATION OF DELAWARE

PROCESS FOR THE TREATMENT OF HYDROCARBON OILS

Application filed July 18, 1929. Serial No. 379,101.

The present invention relates to the art of treating hydrocarbon oil and more specifically comprises an improved sulphuric acid treatment which will be fully understood from the following description and the drawing.

The drawing is a semi-diagrammatic view in sectional elevation of an apparatus constructed according to my invention and shows the flow of materials.

Referring to the drawing, reference characters 1 and 2 indicate treating vessels, only two being shown, but it will be understood that several such vessels may be arranged in a series. In connection with each treating vessel there is a settling or separation chamber 3 and 4 respectively for chambers 1 and 2 and the whole outer surface is covered with an insulating cover 5 so that the treating vessels and settling chambers may be operated at temperatures below normal atmospheric temperature. Gas tight tops 6 are also provided to prevent the escape of gases to the atmosphere and to allow operation at superatmospheric pressure.

The oil is forced through line 7 into a nozzle 8 into which a regulated quantity of sulphuric acid is also forced by line 9 and at the same time sulphur dioxide under a pressure in considerable excess of atmospheric, preferably in a liquid condition, is admitted to the nozzle 8 by line 10. The nozzle preferably discharges through a pipe 8$^b$ below the liquid level in vessel 1 and an additional quantity of sulphur dioxide may be admitted to the vessel through spray pipe 11 fed from line 10. Agitation is generally sufficiently taken care of by the expansion of the gas but additional stirring may be provided.

The oil and acid mixture flows over a partition 12 into the settling chamber 3 which is unagitated so that the acid sludge settles from the oil. The sludge is removed by pipe 13 and the oil layer flows by a line 7$^a$ through a nozzle 8$^a$ and into chamber 2. The parts of vessel 2 and settling chamber 4 are given numbers corresponding to those of vessel 1 and chamber 3 except that in the former case the numbers are marked with an "$a$". Nozzle 8$^a$ is fed with acid and sulphur dioxide in the same manner as nozzle 8.

The treated oil flowing from the last settling chamber 4 is removed by line 14, warmed by heater 15 and discharged into a vent tank 16 which may be at a lower pressure. Oil free of $SO_2$ is withdrawn by line 17 to storage (not shown) while the gas is vented by line 18.

Pipes 19 and 19$^a$ are provided in the gas tight tops 6 to carry off gas and are connected into a manifold 20 which conducts the gas to an oil washing tank 21 to which oil may be added continually, if desired. The gas escapes by line 22 to compressor 23, cooler 24, in which it may be liquefied, and thence into a manifold 25 which feeds lines 10 and 10$^a$. Sulphur dioxide from vent tank 16 and additional sulphur dioxide may be added by way of line 26 to make up for losses.

In the operation of my process oil and acid are mixed and simultaneously sulphur dioxide is expanded from a considerably higher pressure into the mixture. It is preferable to exclude air during the mixing and to expand the sulphur dioxide from a liquid condition but liquefaction is not requisite. I contemplate operation both with liquid and gaseous sulphur dioxide although the former is preferable. It is also desirable to provide a considerable partial pressure of $SO_2$ over the oil during treatment and settling the minimum pressure depending on the temperature of treatment, for example, at 20° C. it should not be below about 20 mm. of mercury and at 40° C. not below about 60 mm. of mercury and higher at correspondingly higher temperatures. It is preferable to maintain a superatmospheric pressure of sulphur dioxide, however, as will be understood.

As an example of my process a distillate Sample A, from Peruvian crude and having a viscosity of about 400 seconds Saybolt at 100° F. is treated with 4 batches of sulphuric acid containing 20% of oleum, each batch of acid being 5% by weight of the oil. After each acid treatment sludge was settled and withdrawn and during the mixing and the entire treatment period a strong current of sulphur dioxide is forced through the oil expanding from a pressure in considerable excess of atmospheric and temperature is held at 20° C. The color of the oil after neutralization and washing is 10½ Robinson and has a viscosity of 342 seconds Saybolt at 100° F. Another Sample B of the same distillate is treated in the same apparatus with the same quantity of acid but without addition of sulphur dioxide, and the finished oil produced has a color of 10 Robinson. The oil produced by the present improved process, Sample A, showed a resistance emulsification of 1 as compared with 20+ from the other Sample B prepared in the ordinary manner.

The Samples A and B were then subjected to a rapid oxidation test in which temperature, time and the volumes of oil and air used are equal. Acidity developed in each sample after a definite time is determined by titration and is found to correspond to 12 mg. of KOH per gram of oil from Sample A, and to 24 mg. from Sample B. After oxidation Sample A remained clear and the color had dropped only one point on the Robinson scale while the color of Sample B is too dark to measure and an appreciable quantity of sludge settles.

The present process may be used to treat other types of oils such as gasoline or kerosene with advantage as to color, color hold having quality and the like and the temperature of the treatment may be considerably below atmospheric, for example as low as −10 to −20° C. or even lower if desired. My process is not to be limited to the use of fuming or concentrated sulphuric acid, although it is particularly advantageous when making white or medicinal oils with fuming acid or acid stronger than 66° Bé. My invention is not to be limited to any theory of the mechanism or the chemistry of the process but only to the following claims in which I wish to claim all novelty inherent in the invention.

I claim:

1. An improved process for the purification of hydrocarbon oil comprising mixing oil and sulphuric acid, simultaneously expanding a high pressure fluid containing a substantial quantity of sulphur dioxide into the mixture whereby said mixture is maintained at a suitable reduced temperature and separating purified oil, acid sludge and gas.

2. A continuous process for the purification of hydrocarbon oil comprising forcing together separate streams of sulphuric acid, hydrocarbon oil and a high pressure fluid rich in sulphur dioxide into a mixing zone in which pressure is rapidly reduced and discharging the mixture into an agitation zone whereby said mixture is maintained at a suitable reduced temperature, withdrawing fixed gas, withdrawing a mixture of oil and acid sludge into a separation zone and separately withdrawing oil and acid sludge therefrom.

3. Process according to claim 2 in which additional sulphur dioxide is added to the oil-acid mixture in the agitation zone.

4. Process according to claim 2 in which the oil is a lubricating distillate and the acid is stronger than 66° Bé.

JACKSON R. SCHONBERG.